Aug. 11, 1953

L. B. COURTOT 2,648,550

RESILIENT INTERCHANGEABLE TUBE COUPLING

Filed Aug. 17, 1948

INVENTOR.
LOUIS B. COURTOT
BY Richey & Watts
ATTORNEYS

Patented Aug. 11, 1953

2,648,550

UNITED STATES PATENT OFFICE 2,648,550

RESILIENT INTERCHANGEABLE TUBE COUPLING

Louis B. Courtot, Cleveland, Ohio, assignor to The Weatherhead Company, Cleveland, Ohio, a corporation of Ohio Application August 17, 1948, Serial No. 44,771

2 Claims. (Cl. 285—122)

This invention relates to fittings and, more particularly, to a fitting for coupling with a tube by means of a tube-cutting ring that cuts into the metal of the tube when the fitting elements are assembled with the tube.

Tube couplings like those disclosed in the patent to Kreidel, 2,139,413, and Wurzburger, 2,414,184, have found wide acceptance in the trade because not only do they provide an effective seal but they also form a mechanically strong and vibration-proof joint. In this type of fitting, a tube-cutting ring or sleeve is the active element and has a cutting edge that is cammed into engagement with the tube by an outwardly flaring fitting wall. When the fitting is set up or tightened the cutting edge of the ring either cuts into and shears up material of the tube or merely cuts into the tube without appreciable shear to provide an unusually effective joint. Although the fittings of the type described in the aforesaid patents have proven eminently satisfactory, the manufacture of the rings presents production difficulties and is an item of some expense. The cutting rings are mass production items and, not only are they small in section which makes them difficult to handle in a lathe or screw machine, but in many cases they are made of alloy steel such as stainless steel which material is difficult to machine.

The principal object of the present invention resides in a simplification of the manufacturing process for such tube-cutting rings, which simplification not only provides a ring that is equally as effective as the prior devices, but in some respects superior thereto.

Another object resides in an increasing of the vibration resistant properties of the fitting, which is accomplished by forming an intermediate folded rib on the ring that has certain inherent resiliency and acts somewhat as a lock washer.

Still another object resides in facilitating manufacture of the rings by sawing blanks from seamless tubing and simultaneously removing the burrs, usually produced by a sawing operation, and forming the folded rib of the ring in special dies. Preferably, the dies are arranged so that a reversible ring is produced, that is, a ring that may be assembled with the fitting in either of two positions.

It is a feature of the invention that when the folded rib is formed, it is done so by shortening the ring by pressure exerted on the ends thereof in a die which not only removes the burr as described and sharpens the cutting edge, but improves and smooths the surface of the ring intended to engage the camming surface of the fitting.

The manner in which these and other objects are attained will be apparent to those skilled in the art in the following detailed description of a preferred embodiment of my invention.

Figure 1:
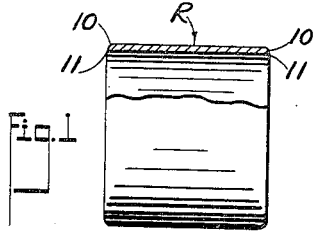
Fig. 1 shows the blank for the ring after having been sawed from a piece of tubing.
Figure 2:
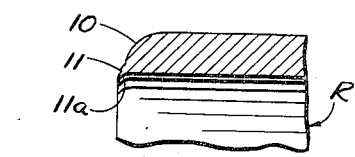
Fig. 2 is an enlarged fragmentary section of the blank showing how a burr may be present as a result of the sawing operation.

Referring to the drawings, the ring blank R is preferably sawed from a piece of seamless tubing of a material selected in accordance to the use to which the fitting is to be put. In many applications the rings are formed of stainless or other alloy steels. It is preferably a one-piece cylindrical member and is sawed so as to provide generally rounded or beveled nose portions 10 and sharp cutting edges 11. However, as seen in Fig. 2, a burr 11a may result from the cutting operation and the nose of the blank may not be smoothly rounded.

Figure 3:
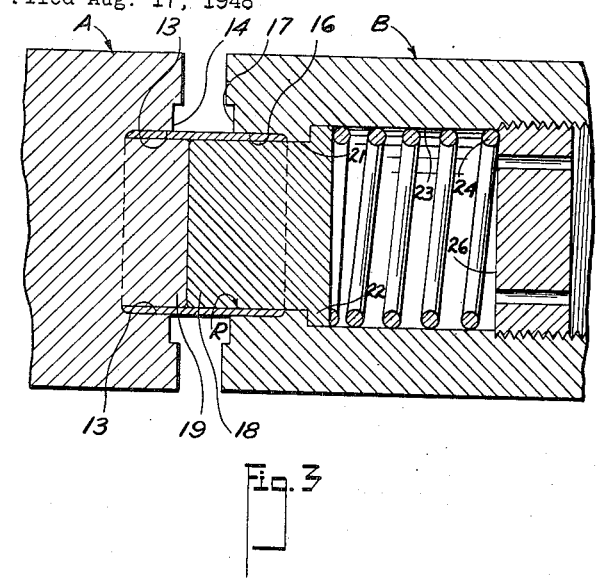
Fig. 3 shows the ring blank inserted in the dies before the forming operation.

As seen in Fig. 3, the ring blanks are placed in a pair of cooperating dies A and B. Die A is formed with an annular cavity 13, the bottom of which is shaped to provide a rounded concave bottom wall intersecting the axial cavity wall to form a sharp cutting edge on the ring. Surrounding the cavity is a relief portion 14. Die B has a cavity 16 similar or identical to cavity 13 in die A and likewise has a corresponding relief portion 17. A plunger 18 is mounted in die B and is urged into engagement with a central body portion 19 of die A by spring 24. The plunger slides in bore 21 of die B and may be formed with shoulder means 22 to retain it in the die. Bore 23 in die B receives the spring 24 which is backed up by nut 26 so that the spring urges plunger 18 toward the other die member.

After the parts are positioned as shown in Fig. 3 with a sawed blank in place in the dies, the die members are closed or brought together by any suitable means whereupon an intermediate section of the ring R buckles or folds outwardly to form a folded rib 29. The ring cannot buckle inwardly because it is backed by members 18 and 19, but the chamber formed by cooperation of relief portions 14 and 17 permits the rib to buckle outwardly.

The endwise pressure on the ring by the dies improves and smooths the rounded nose portions 10, removes any burrs present, and insures that the cutting edge 11 will be fully filled out and sharpened. The cutting edge of the ring may be compressed and rendered somewhat harder by the forming operation. If the ring is to be heat-treated, it may be done so after the forming operation in the dies.

When the ring is completed it includes the walls 30 and 31, which in the preferred form are in substantial engagement and form the rib 29. The rib connects inwardly with a pair of aligned cylindrical sections 32 and 33. Since these sections are entirely confined in the dies during the forming operation, their shape is unchanged except for the improvement of the ends as described above.

Figure 5:
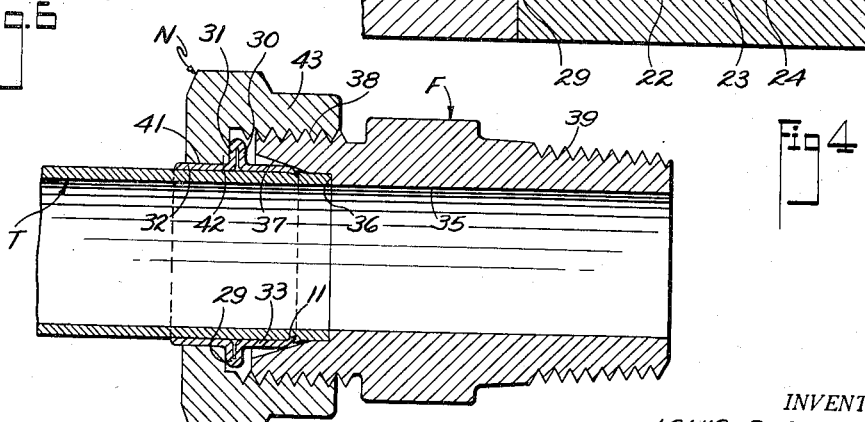
Fig. 5 shows the ring clamping the tube in a typical fitting.

As seen in Fig. 5, the ring is assembled in a fitting, one form of which includes a fitting body F and a nut N. Body F has a fluid conducting bore 35, intermediate shoulder 36 against which the end of tube T is fitted and an outwardly flaring internal wall 37. The fitting F may likewise be provided with threads 38 for receiving the nut and suitable means for coupling to other members such as threads 39. Nut N has a bore 41, preferably of a diameter to snugly receive one of the cylindrical sections of the ring R, section 32 being shown disposed in the bore. Nut N likewise includes a shoulder 42, preferably complementary to the rib 29 of the ring, and the nut may have a threaded sleeve portion 43 so that it can be tightened against fitting F.

When the nut N is tightened, surface 37 causes the forward cutting edge 11 to cut into metal of the tube, and depending upon the shape of the parts the ring may simultaneously shear up metal of the tube as described in the Kreidel and Wurzburger patents referred to. The force due to tightening the nut is exerted against the rib 29 which is relatively close to the cutting edge so that there is little danger of excessive buckling of the unconfined cylindrical portion 33 of the ring. By confining the cylindrical ring portion 32 between the nut N and tube T, increased life under vibration conditions is obtained. Rib 29 may be slightly resilient so that a resilient loading is applied to the cutting edge which assists in withstanding forces due to vibration.

Although I prefer that the ring be symmetrical with both ends being formed with nose portions 10, cutting edges 11 and of equal length, it will be obvious that in the broader aspects of the invention the rib need not be centered nor need the ends be symmetrical. However, by forming the ring as shown, the ring may be placed in the fitting or on the tube in either position and it will function properly.

Figure 6:
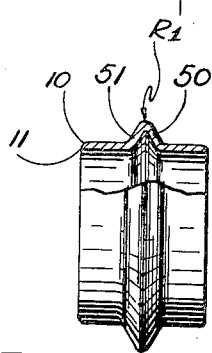
Fig. 6 shows a modified form of tube-cutting ring.
Figure 4:
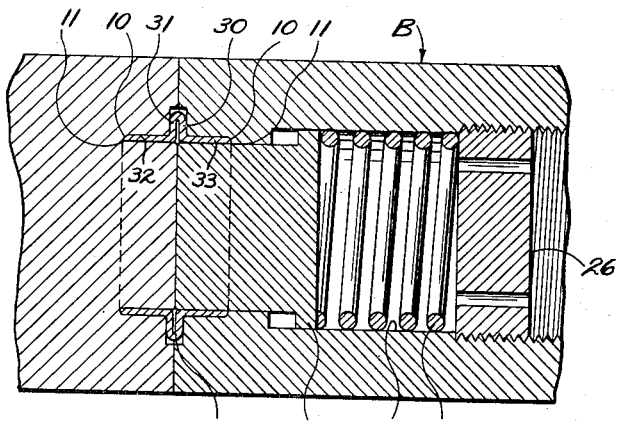
Fig. 4 shows the dies closed and the ring formed.

Although in the preferred form the walls 30 and 31 are substantially in contact, as seen in Fig. 6 a ring R₁ could be manufactured and function satisfactorily if the walls 50 and 51 of the rib were spaced, thereby increasing the resiliency of the joint. Of course, it may be preferable to shape the shoulder of the nut to correspond to the beveled rib in the ring when employing the ring shown in Fig. 6.

I contemplate that these and other modifications may be made without departing from the essence of the invention and its mode of operation so that the appended claims and not the described embodiment determine the scope of the invention.

What is claimed is:

1. A tube coupling comprising a first fitting member having an internal outwardly flaring wall, a fluid conducting bore, and an intermediate seat for the end of a tube, a second fitting member having a bore and a shoulder facing said flaring wall, means to draw said fitting members together, and a unitary cutting ring, said ring comprising a pair of aligned substantially duplicate cylindrical portions joined by an intermediate resilient rib having spaced walls, said ring being constructed and arranged so that when the coupling is assembled with the tube one cylindrical portion is disposed freely in the bore of said second fitting member, said shoulder of said second fitting member engaging the outer wall of said rib at the base thereof adjacent the juncture of said rib with said cylindrical portion for urging the walls of said rib into engagement substantially adjacent to the cylindrical portions and the end of the other of said cylindrical portions into engagement with said flaring surface of said first fitting member, said shoulder advancing said ring axially against said flaring wall thereby camming said end into the surface of the tube until said surface is cut thereby, said resiliency of said rib biasing said end axially against the tube.

2. A tube coupling comprising a first fitting member having an internal outwardly flaring wall, a fluid conducting bore, and an intermediate seat for the end of a tube, a second fitting member having a bore and a substantially radial shoulder facing said flaring wall, means to draw said fitting members together, and a unitary cutting ring, said ring comprising a pair of substantially duplicate aligned cylindrical portions and an intermediate resilient rib having spaced substantially radial walls, said ring being constructed and arranged so that when the coupling is assembled with the tube said one cylindrical portion is disposed freely in the bore of said second fitting member with the end thereof unconfined, the side of the rib furthest from said flaring wall adjacent to said cylindrical portion being engaged by the shoulder of said second fitting member and urging the walls of said rib into engagement substantially adjacent to the cylindrical portions and the end of the other of said cylindrical portions into engagement with said flaring surface of said first fitting member, said shoulder advancing said ring by means of said engagement of the walls of said rib axially against said flaring wall thereby camming said end into the surface of the tube until said surface is cut thereby, said resiliency of said rib biasing said end axially against the tube.

LOUIS B. COURTOT.

References Cited in the file of this patent

UNITED STATES PATENTS

| Number | Name | Date |
| --- | --- | --- |
| 1,063,926 | Schuermann | June 3, 1913 |
| 2,073,909 | Stecher | Mar. 16, 1937 |
| 2,089,790 | Halpern | Aug. 10, 1937 |
| 2,249,169 | Pruckner | July 15, 1941 |
| 2,255,673 | McDermott | Sept. 9, 1941 |
| 2,414,184 | Wurzburger | Jan. 14, 1947 |
| 2,441,995 | Wurzburger | Jan. 28, 1947 |

FOREIGN PATENTS

| Number | Country | Date |
| --- | --- | --- |
| 483,092 | Great Britain | Apr. 12, 1938 |
| 540,088 | Great Britain | Oct. 6, 1941 |
| 575,825 | Great Britain | Mar. 6, 1946 |
| 957,532 | France | Aug. 29, 1949 |